US007437273B2

(12) United States Patent
Enke

(10) Patent No.: US 7,437,273 B2
(45) Date of Patent: Oct. 14, 2008

(54) METHOD FOR MONITORING AND ANALYSING THE PRINTING PROCESS OF A PRESS

(75) Inventor: Gregor Enke, Augsburg (DE)

(73) Assignee: MAN Roland Druckmaschinen AG, Offenbach an Main (DE)

( * ) Notice: Subject to any disclaimer, the term of this patent is extended or adjusted under 35 U.S.C. 154(b) by 0 days.

(21) Appl. No.: 11/581,510

(22) Filed: Oct. 16, 2006

(65) Prior Publication Data

US 2007/0125253 A1 Jun. 7, 2007

(30) Foreign Application Priority Data

Oct. 17, 2005 (DE) ...................... 10 2005 049 896

(51) Int. Cl.
*G06F 11/30* (2006.01)
*G06F 15/00* (2006.01)

(52) U.S. Cl. ..................................................... 702/183

(58) Field of Classification Search .................. 702/183
See application file for complete search history.

(56) References Cited

U.S. PATENT DOCUMENTS 4,003,311 A * 1/1977 Bardin ........................ 216/10
5,057,936 A * 10/1991 Bares ......................... 358/405
5,564,841 A * 10/1996 Austin et al. ................ 400/103
7,146,111 B2 * 12/2006 Fujimoto et al. ............... 399/9
2003/0156299 A1 * 8/2003 Martinez et al. ............. 358/1.9
2004/0042022 A1 * 3/2004 Friedman et al. ............. 358/1.9
2005/0240376 A1 * 10/2005 Uwatoko et al. ............ 702/183
2007/0291289 A1 * 12/2007 Kuo et al. .................... 358/1.9
2008/0062484 A1 * 3/2008 Moriya et al. ............... 358/534

FOREIGN PATENT DOCUMENTS

WO WO 2007/071826 * 6/2007

* cited by examiner

*Primary Examiner*—Michael P. Nghiem
*Assistant Examiner*—Cindy H Khuu
(74) *Attorney, Agent, or Firm*—Cohen Pontani Lieberman & Pavane LLP

(57) ABSTRACT

A method for monitoring and analysing the printing process of a press includes both measured data which reproduce or influence the quality of the printed product and measured data which reproduce the state and consumption of the press or its parts are acquired. To monitor and analyse the printing process, the acquired measured data are placed in a relationship with one another, so that the printing process can be monitored effectively via new data produced as a result.

19 Claims, 11 Drawing Sheets

METHOD FOR MONITORING AND ANALYSING THE PRINTING PROCESS OF A PRESS

BACKGROUND OF THE INVENTION

Field of the Invention

The invention relates to a method for monitoring the printing process of a press and in particular to methods which permit different types of measured data to be combined. The invention also relates to a computer program for implementing the method according to the invention.

Methods for displaying production and machine data from presses are known from the prior art. Each of these methods is implemented by a computer program installed on a computer which is connected via a network to one or more presses. Using the computer program, production and machine data are acquired and stored, so that production and machine data from the presses over a number of years can also be evaluated statistically.

The data acquired in the prior art methods relate to what are known as logbook data, which make it possible for the user to understand various machine states over the course of time. A machine state may, for example, be a fault message from units in the machine assembly or a user defined message with respect to a machine stoppage. Furthermore, for example the start and end time of a production run are recorded in the logbook and the number of copies achieved is documented. The logbook data make it possible, for example, to evaluate the productivity of a shift in retrospect and to discover possible accumulations of problems.

The disadvantage of these prior art systems is that they do not provide any possibility of making statements about the quality of the printed product. This means in particular statements which are connected directly to machine state events.

SUMMARY OF THE INVENTION

An object of the present invention to provide a method which makes it possible to make statements about the quality of the printed product as a function of machine states.

According to the invention, a method for monitoring the printing process of a press is provided. The press has a quality data acquisition device for acquiring measured data which have a relationship with the quality of the printed product. The measured data are not necessarily determined directly on the machine; instead, for example, quality and material data can be acquired by the quality data acquisition device by these being read in from another system via an interface, for example, or entered by specialist personnel. Quality parameters of this type are, for example, the ink density, the quality of the materials used, the web tension, the colour register and the cut register. This means that the measured data relate firstly to parameters which are measured directly on the printed product, such as the ink density, but also to parameters which have to do with the machine state or material but have direct effects on the quality of the printed product, such as web tension, paper quality.

Furthermore, the press has a machine data acquisition device. The machine data acquisition device reproduces the state of the press and/or parts of the press by means of the acquired measured data. The machine data acquisition device acquires both states which are generated automatically by sensors on the press and states which are entered into the machine data acquisition device by the user. Measured data of the machine data acquisition device are, for example, fault messages from units in the machine assembly, production data such as numbers of revolutions of the cylinders or output copy numbers, as well as machine stoppage messages. By means of the machine data acquisition device, state data are acquired which can also represent an event, such as blanket washing.

All the measured data acquired in the method can be generally designated production relevant data. This also comprises data which arise before, during and after production. This is because planning, calculation and presetting data are generated before the production. During the production they are, as already explained, data from all the units in the production sequence, that is to say state, fault and information messages which are generated automatically by the units or entered manually by a user. The automatically generated data are supplied by measuring systems and sensors on the press. After production, data can likewise arise which are produced by the analysis and compression of the production relevant data.

Consequently, the production relevant data come partly from a system arranged above the production system, which provides planning, calculation and presetting data. Data from production means upstream and downstream of the production system, which are of interest for the production run, are likewise acquired and stored. These are primarily time, quality and quantity data as well as information about materials used. Data from units, metering systems and sensors which are needed during production supply, likewise sequentially, data about times, state and materials used.

By means of the subsequent processing of the relevant data, additional information about the production run, which cannot be determined automatically, can be generated. In addition, the correctness and completeness of the data can be checked and supplemented. As a result, the preconditions are provided for the subsequent analysis to determine correct and consistent values.

According to the invention, the measured data of the quality data acquisition device and the measured data of the machine data acquisition device are combined with one another in order to monitor the printing process, so that, within the context of the method, evaluation data are available. In general terms, as a result of collecting an extremely wide range of production relevant data, it is possible to analyse these data on a time basis and to place them in a relationship with one another. As a result of this possibility of linking, the data can be evaluated from many points of view, depending on the objective of the analysis. Particularly relevant within the scope of this invention is the placing in a relationship of measured data from a quality data acquisition device, such as the ink density, the web tension, the colour register and the cut register, with all the other acquired data, which are assigned to the machine data acquisition device. However, it is also conceivable to place measured data from the quality data acquisition device or measured data from the machine data acquisition device in a relationship with one another and to analyse them. In this way, for example ink density fluctuations arising from deficiencies in paper quality can be acquired and evaluated.

By means of the combination of the acquired data, it becomes possible to connect specific events and states during the printing process with quality data from the printed product and to generate evaluation data from this. From the evaluation data, suitable open-loop or closed-loop control stipulations can then be output to the printing process, but statistics which make it possible to observe and adapt the printing process in the long term can also be drawn up.

For the purpose of illustration, the following example is to be presented. The machine data acquisition device acquires, inter alia, the web breaks which occur during the printing process. This corresponds to an event during the printing process. At the same time, the quality data acquisition device acquires the paper grade and thus the paper quality which is used during the printing process. If these measured data are then placed in a relationship and stored over a plurality of production runs, they can be used to generate evaluation statistical data which make it possible to draw conclusions about the cause of the web break event. If the evaluation statistical data exceed a specific limiting value, then an appropriate open-loop or closed-loop command can be output. The open-loop or closed-loop command can, for example, be output directly to an actuator belonging to the press or else on a monitor.

The example mentioned has shown that it is advantageous to store the acquired measured data and to evaluate them statistically. The data are stored centrally and/or decentrally. The production run is taken as a criterion for making the data uniquely identifiable. By means of the statistical evaluation, quality statistical data, machine statistical data and evaluation statistical data are obtained. This means that there is the possibility of combining not only the measured data from the quality data acquisition device and the machine data acquisition device but also the quality statistical data and the machine statistical data. The quality and material data already mentioned, which for example are read in and not acquired by measurement, are also counted as measured data from the quality data acquisition device within the scope of this invention. Statistical evaluations of quality and material data are also carried out. These are covered by the quality statistical data.

It is additionally advantageous to output all the measured data and statistical data to a display device which may, for example, be a monitor on the machine itself or, connected via a network, a monitor at a location remote from the press.

The measured data are output in a graphically prepared form, which permits the user faster and obvious access to the events and the quality changes associated therewith. If a relatively long time period of the printing process is analysed, then the automatic creation of a report is recommended. This report can be configured by the user, so that all the data relevant to the user appear in the report.

By means of the method described here, it becomes possible to carry out a detailed diagnosis over relatively long time periods, to compare production systems with one another, to compare companies and sites, to observe the production system, to maintain the production system preventatively, to operate detailed production system diagnoses, to carry out process optimization, to detect and eliminate weak points in the design, to use the data material to determine specific characteristics which make the observation of the production system easier, to determine characteristics which describe the productivity of the production system, to observe the status and the state of editions, production systems and their material supply, and to trigger actions and to make statements of quality relating to materials used.

The method illustrated can be implemented by a computer program.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained below by using an exemplary embodiment. In the drawings.

DETAILED DESCRIPTION OF THE PRESENTLY PREFERRED EMBODIMENTS

Figure 1:
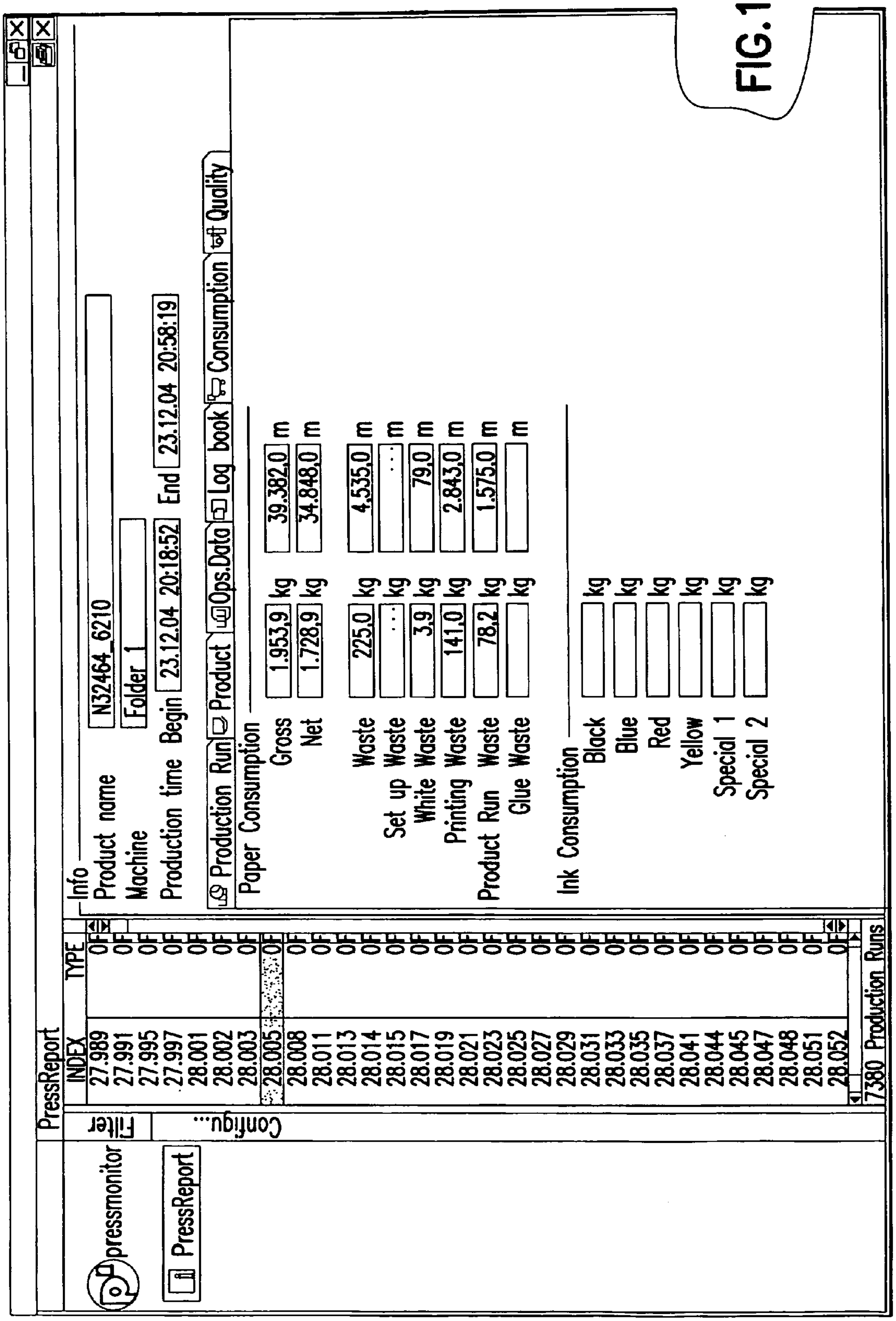
FIG. 1 is a screenshot of a computer program for displaying the consumption within the context of a printing process report according to an embodiment of the present invention.

FIG. 1 shows a screenshot from a computer program for implementing the method according to the invention. Illustrated here are measured data from the machine data acquisition device and, more precisely, measured data which relate to the consumption of the materials used. Here, the consumption is organized into paper consumption and ink consumption. In the case of paper consumption, a distinction is drawn between rejects with the fine classification changeover rejects, white rejects, printing start-up rejects, continuous printing rejects and adhesive rejects and, separately, the paper consumption which was consumed for the end product. In the case of the ink consumption, the individual inks used are acquired by the machine data acquisition device. The data illustrated are acquired in relation to a production run which is put into concrete terms by specifying the time of the production run and the machine used.

Figure 2:
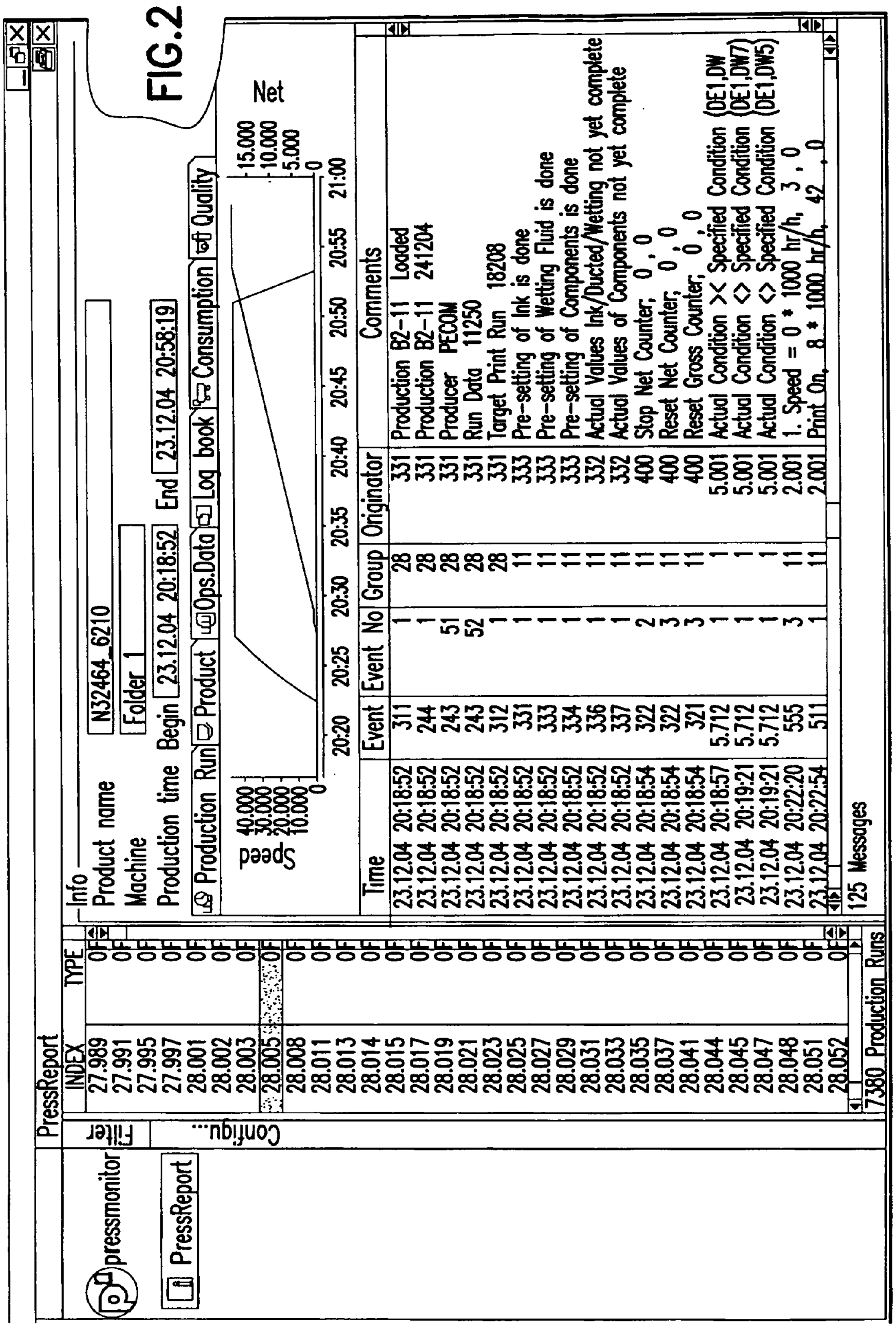
FIG. 2 is a screenshot of the computer program of FIG. 1 for displaying the logbook within the context of a printing process report.

FIG. 2 shows the display of the logbook by means of a computer program. The logbook represents all the events of the machine which, for example, can be: machine stoppage, fault message from units in the machine assembly, operating message from units in the machine assembly, fault, operating and stoppage messages input by the user, and production data and speed messages. The states and events mentioned can be prepared graphically in that, as shown in FIG. 2, the speed or-the number of copies is plotted against the production time. The events from the logbook can then be seen by means of markings in the graphic.

Figure 3:
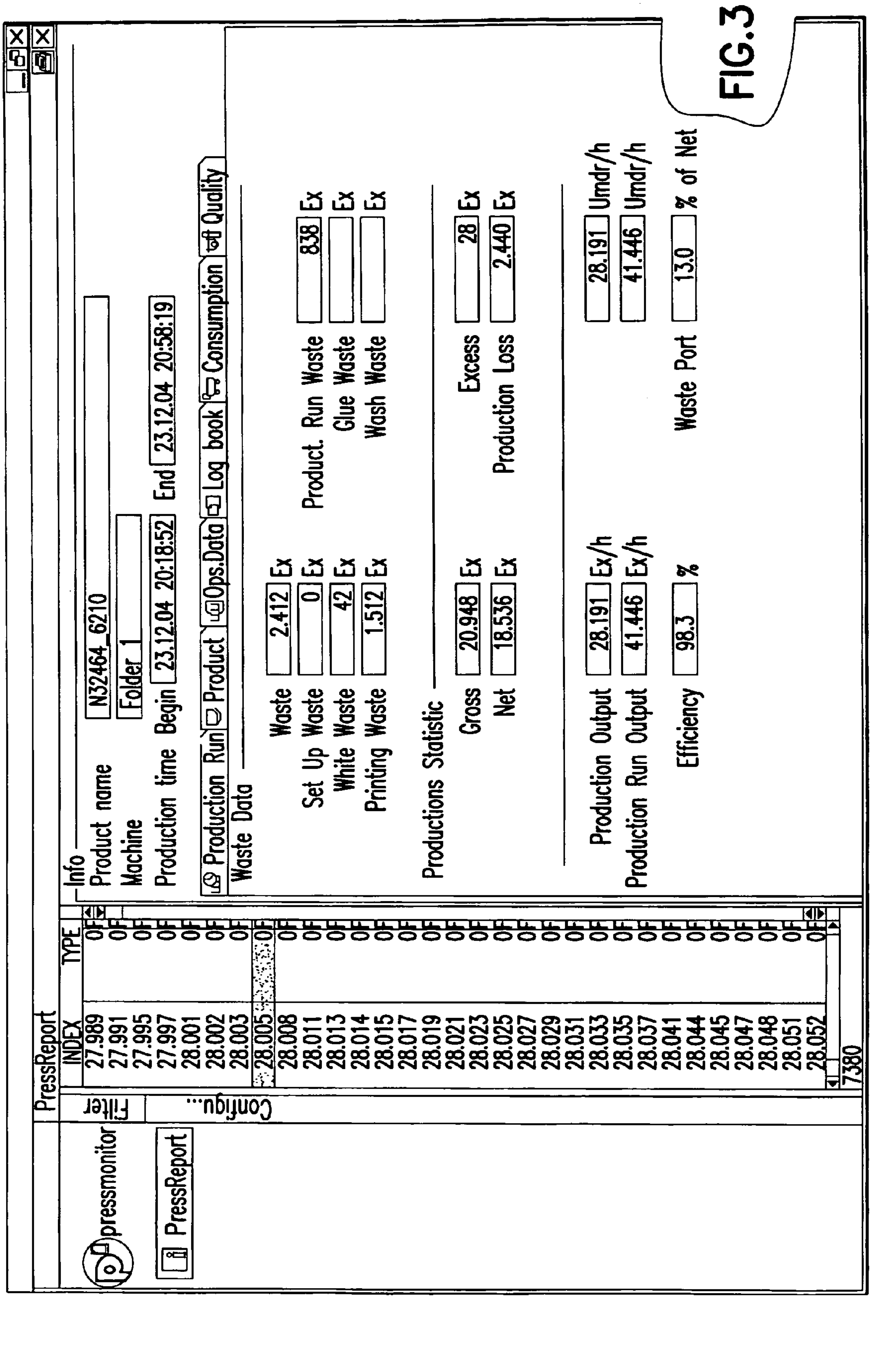
FIG. 3 is a screenshot of the computer program of FIG. 1 for displaying the characteristics within the context of a printing process report.

FIG. 3 shows a screenshot from the computer program of this embodiment, in which various relevant characteristics of the printing process are shown. Here, the rejects consumption is illustrated in the form of copies, so that, within the context of production statistics for a production run, the production performance, the continuous printing performance, the level of utilization and the proportion of rejects can be determined in a straightforward manner. As a result of the compression of the data to form characteristics, the evaluation can be carried out at various levels. The evaluation is carried out from the coarse into the detail, that is to say the characteristics illustrated are considered first. Should these differ from planned values, it becomes necessary to go to the next, lower evaluation level. In this case, the lowest level is the measured data level. If the characteristics exceed a predefined and preset limiting value, then open-loop or closed-loop commands are output to the press.

Beyond the scope illustrated graphically here, the characteristics can be characteristics which result from combining the measured data from the quality data acquisition device and the measured data from the machine data acquisition device. Thus, these characteristics, which result from the combination according to the invention, can also violate predetermined limiting values. Furthermore, specific data patterns of characteristics can also be generated which, in a proper production run, substantially correspond to preset data patterns and, for the case of a deviation from the predetermined data pattern, trigger an automatic action, so that a signal is output to the machine or to an observation computer. This also makes it possible to detect a specific fault behaviour of the production system preventatively.

Figure 4:
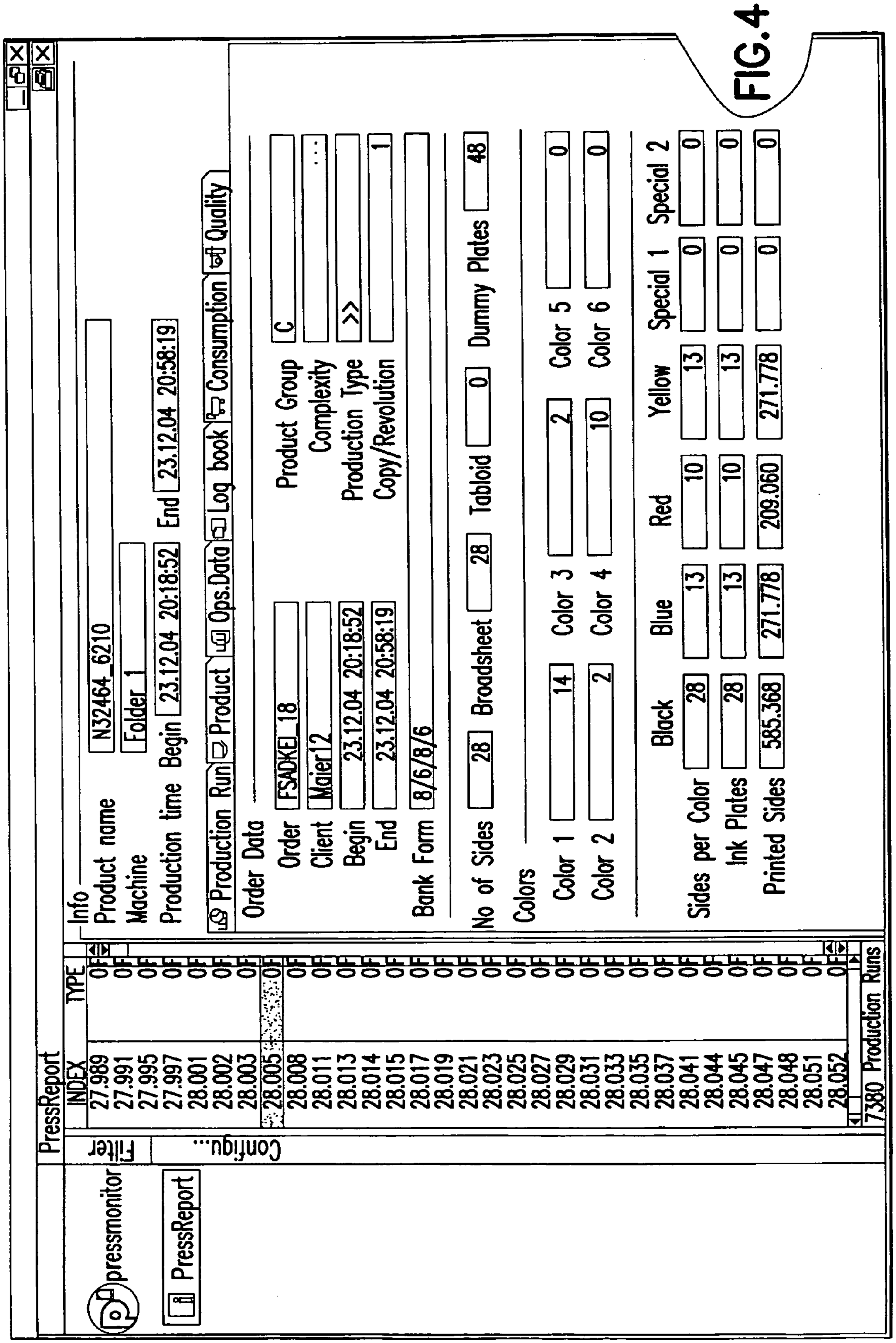
FIG. 4 is a screenshot of the computer program of FIG. 1 for displaying the product within the context of a printing process report.
Figure 5:
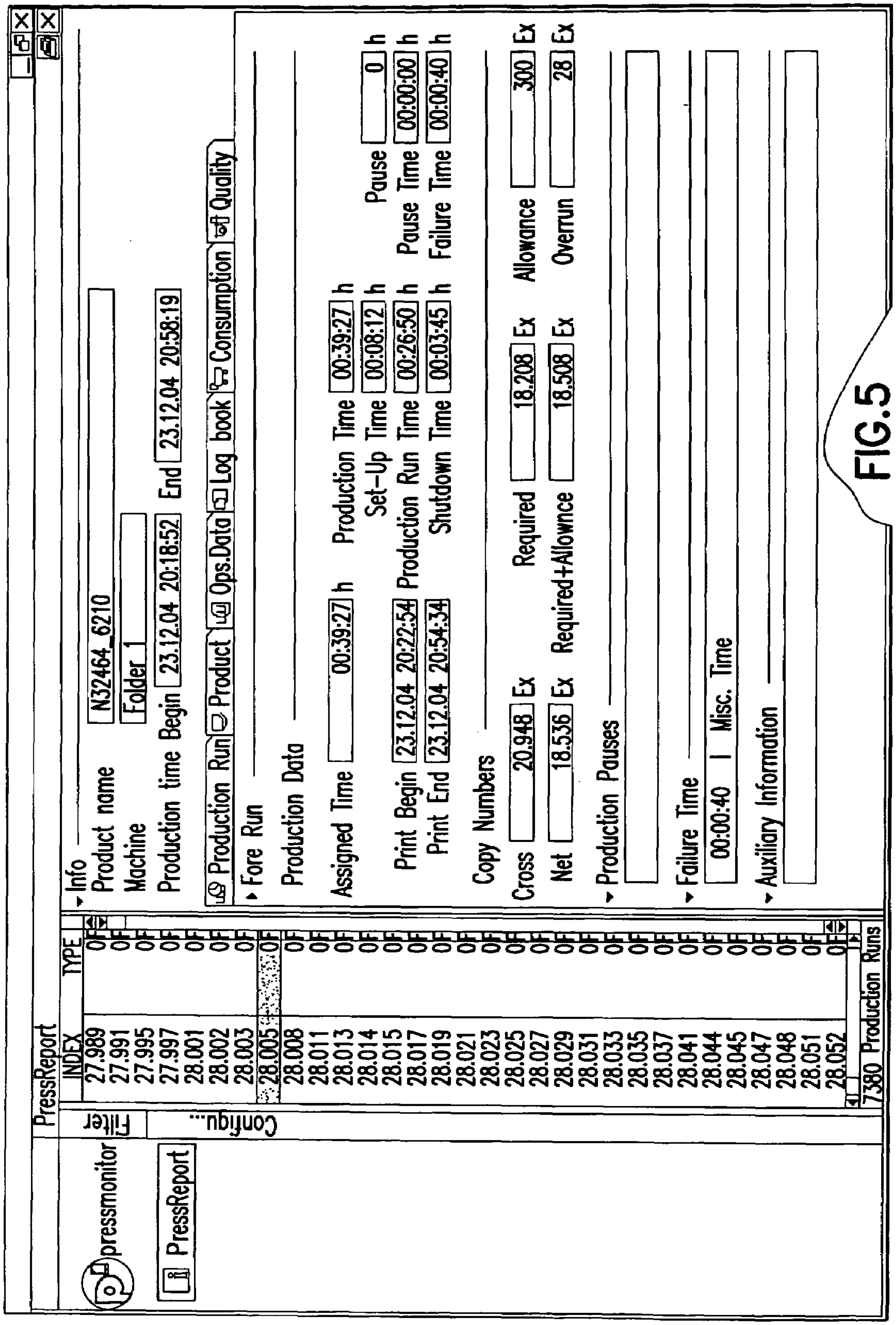
FIG. 5 is a screenshot of the computer program of FIG. 1 for displaying the production run within the context of a printing process report.

FIG. 4 shows a display of the production data of a production run. The job data for the administration of the production run are documented here. FIG. 5 shows a screenshot relating to the display of the production run. Here, in particular, the division of time of a production run and the number of copies are determined.

Figure 6:
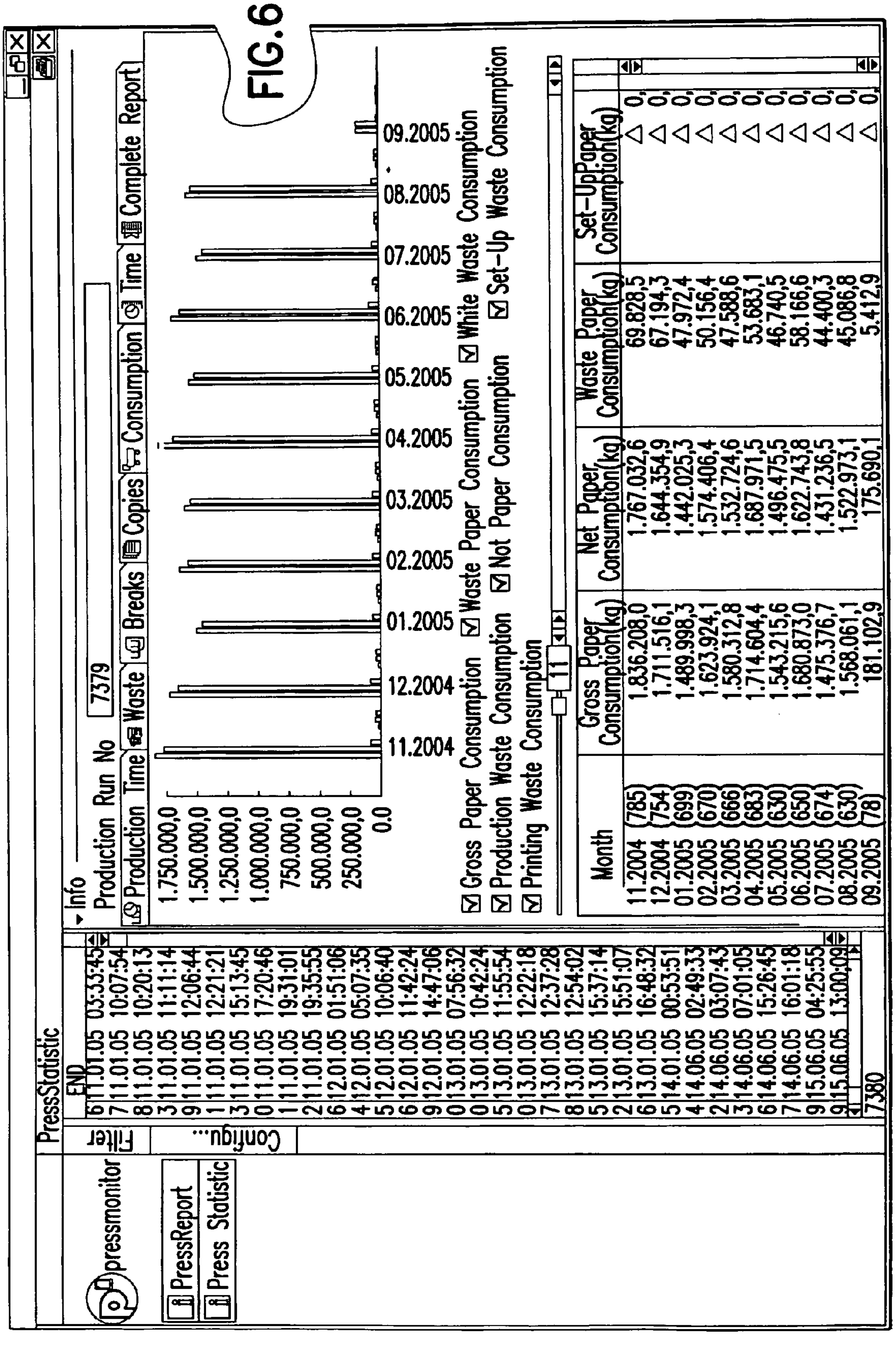
FIG. 6 is a screenshot of the computer program of FIG. 1 for displaying statistical evaluations with respect to the consumption over a comparatively long time period.

All the above-described data which relate to a single production run are stored and can be monitored by means of displaying statistics. FIG. 6 shows the display of the consumption over a plurality of production runs, in a single production run the type of consumption being subdivided further into changeover rejects, white rejects, printing start-up rejects and continuous printing rejects.

Figure 7:
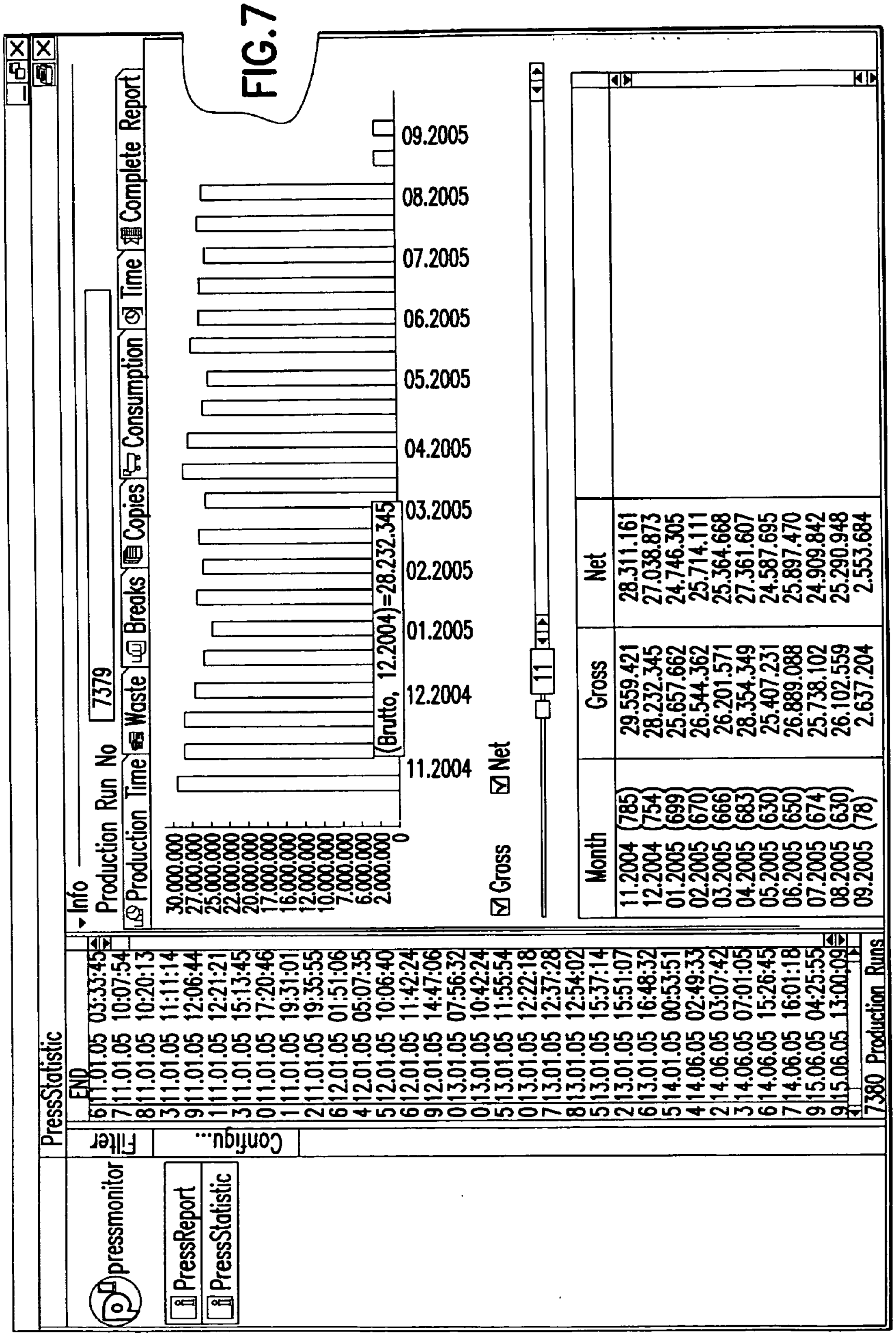
FIG. 7 is a screenshot of the computer program of FIG. 1 for displaying statistical evaluations with respect to the copies over a comparatively long time period.
Figure 8:
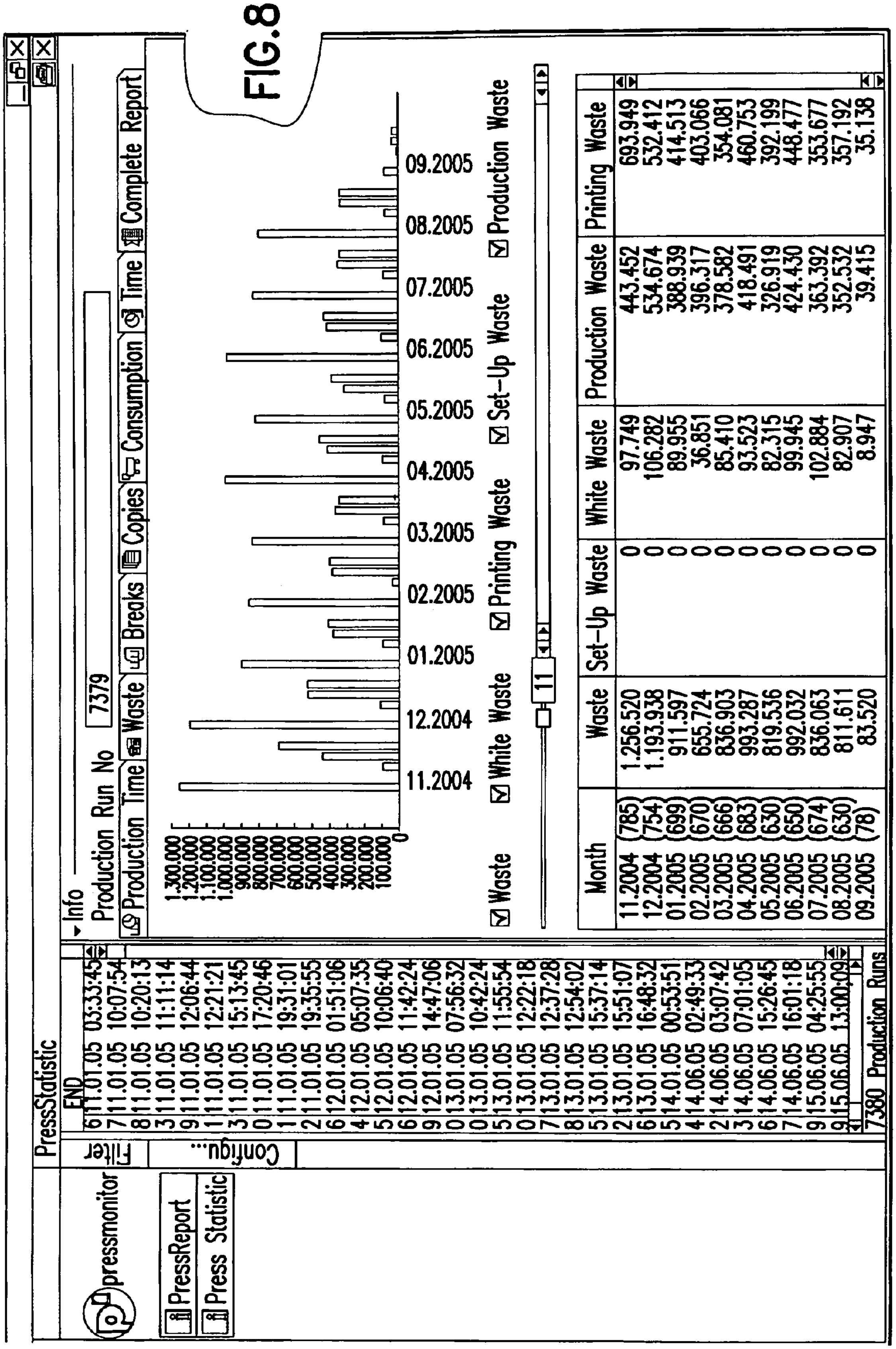
FIG. 8 is a screenshot of the computer program of FIG. 1 for displaying statistical evaluations with respect to the rejects over a comparatively long time period.
Figure 9:
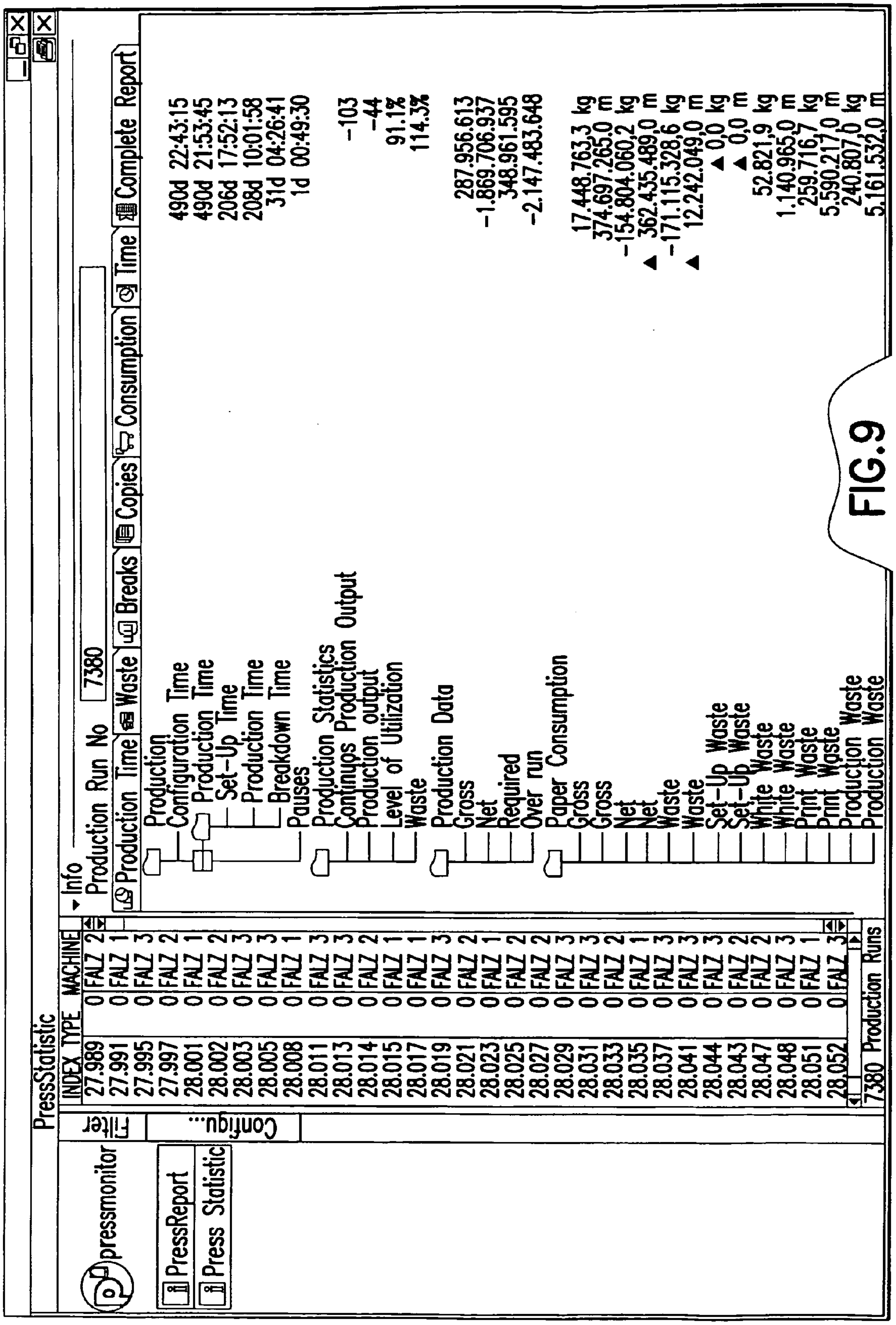
FIG. 9 is a screenshot of the computer program of FIG. 1 for displaying statistical evaluations with respect to the total report over a comparatively long time period.

FIG. 7 shows a statistical evaluation of the number of copies over a relatively long time period. FIG. 8 shows a statistical evaluation of the types of rejects, here specified in numbers of copies. FIG. 9 shows a report which can be drawn up automatically and which can be configured freely by the user. The report is drawn up at definable times, for example at the end of a shift, and, for easier handling, can be converted into a suitable format and printed out.

Figure 10:
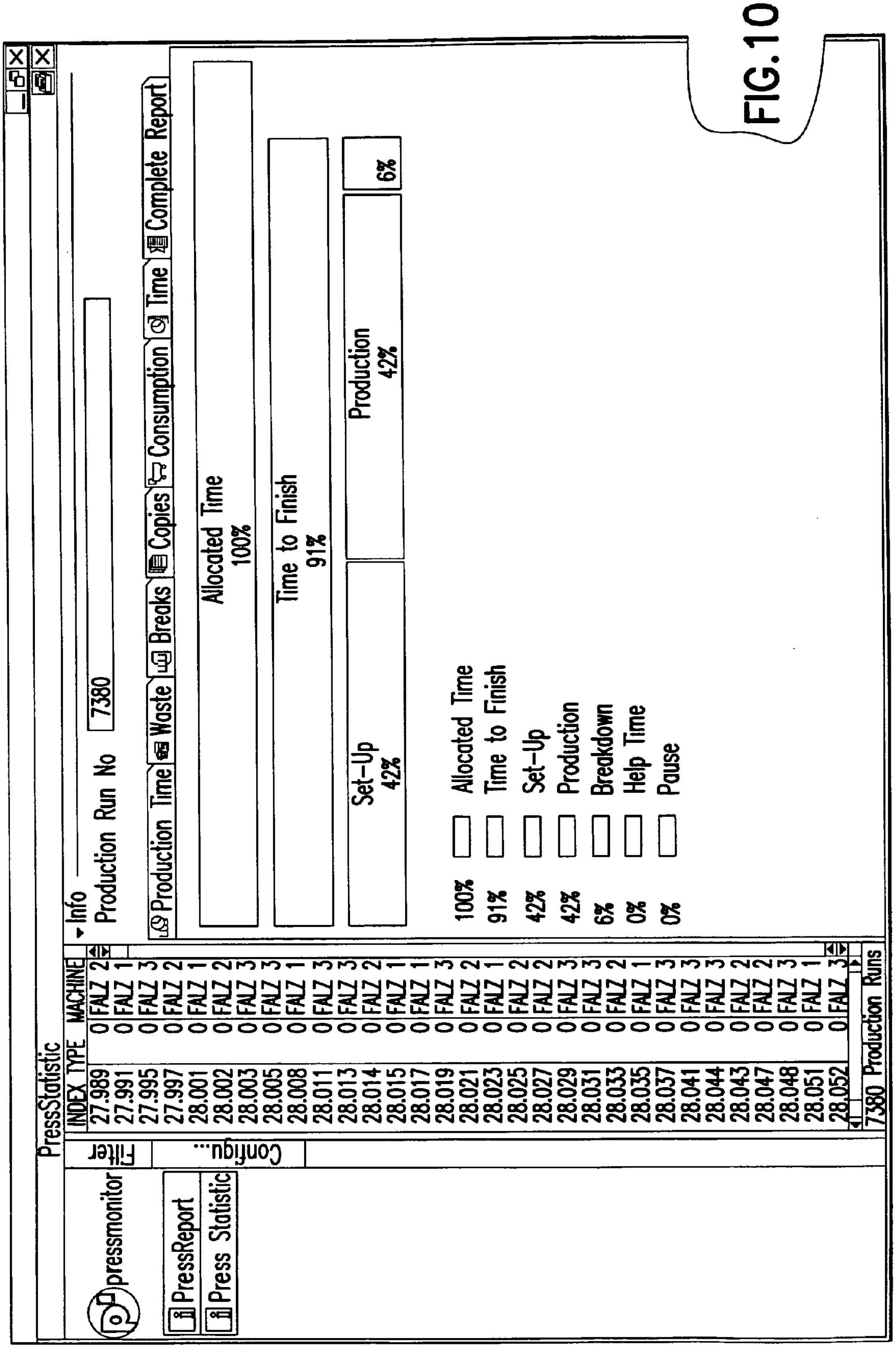
FIG. 10 is a screenshot of the computer program of FIG. 1 for displaying statistical evaluations with respect to the division of time over a comparatively long time period.
Figure 11:
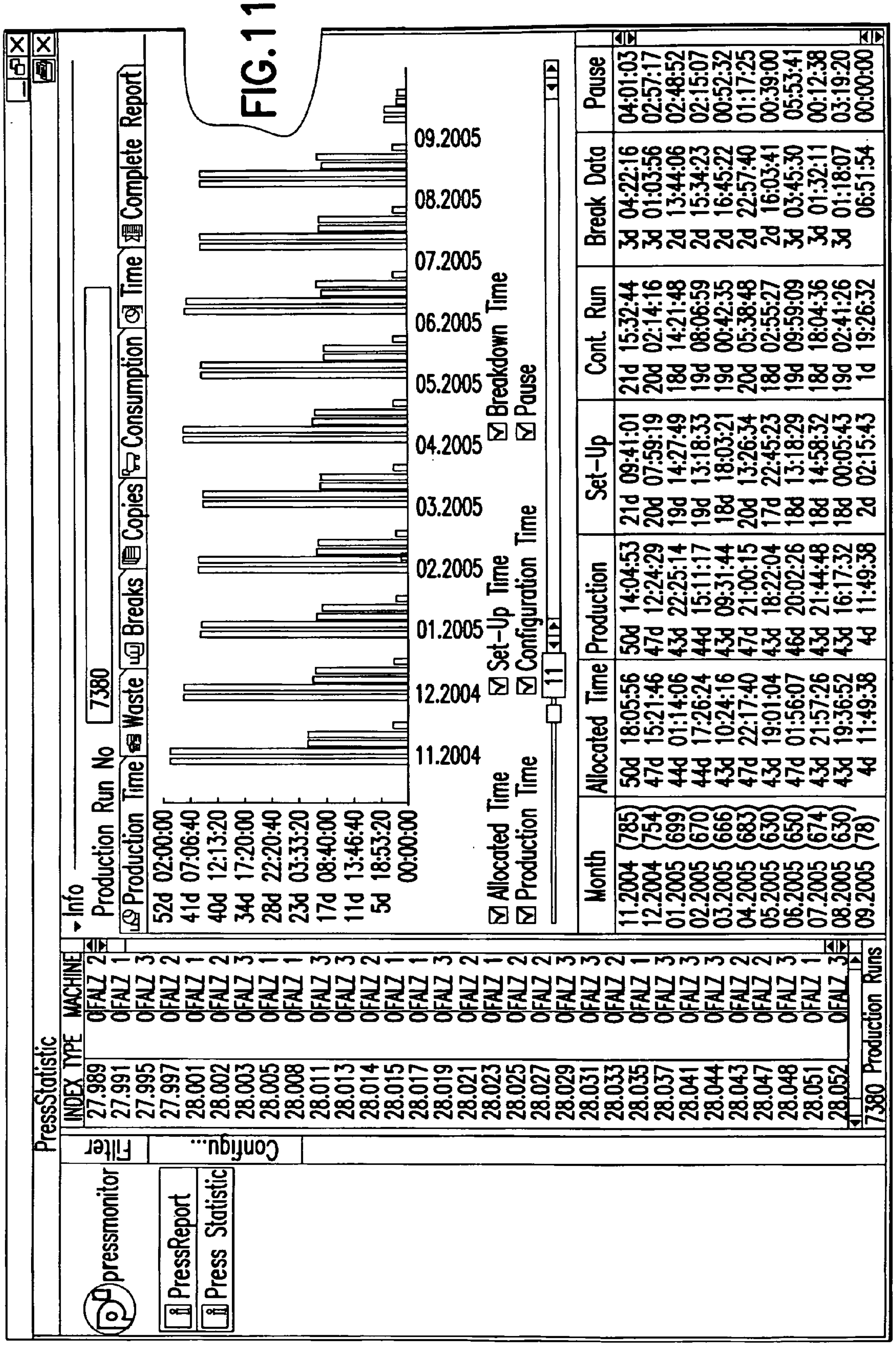
FIG. 11 is a screenshot of the computer program of FIG. 1 for displaying statistical evaluations with respect to the production times over a comparatively long time period.

FIG. 10 shows an evaluation of the division of the time which, in the spirit of the invention, also represents a characteristic which makes it possible for the user to monitor the exceeding of certain intended predefinitions. FIG. 11 is a further display of the production times, which likewise count as statistical characteristics in the spirit of the invention.

For all data of this embodiment, whether they are now statistical or based on a production run, it is true that these can be placed into a relationship with one another. Within the context of the invention, these data can now also be placed in a relationship with data which reproduce or at least influence the printing quality of the printed result. As a result of this possibility of linking, the data can be evaluated from diverse points of view, depending on the objective of the analysis. The evaluation data and evaluation statistical data, subdivided into various hierarchical data levels, can then be compared with specific intended predefinitions, so that a signal can automatically be generated when specific predefinitions are not met. For example, the reject rate can be determined on the basis of the blanket washing event. If the characteristic which, for example, is formed by linking the "blanket washing event" data with the "image quality" data exceeds a limiting value defined in advance, then a corresponding signal is output to the press and/or a display device.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring the printing process of a printing press, comprising the steps of:

acquiring first measured data using a quality data acquisition device, the first measured data at least one of reproducing and influencing a quality of the printed product;

acquiring second measured data using a machine data acquisition device, the second measured data including data reproducing the state of at least part of the printing press and data reproducing the consumption of the materials used; and combining the first measured data and the second measured data with one another to form evaluation data in order to monitor the printing process.

2. The method of claim 1, further comprising the step of storing the first measured data and the second measured data and evaluating statistically the stored first and second measured data to form quality statistical data and machine statistical data.

3. The method of claim 1, further comprising the step of storing the evaluation data and processing the stored evaluation data statistically to form evaluation statistical data.

4. The method of claim 2, further comprising the step of combining the quality statistical data and the machine statistical data to form evaluation statistical data to monitor the printing process.

5. The method of claim 1, further comprising the step of outputting the evaluation data on a display device.

6. The method of claim 1, further comprising the step of outputting an open-loop or closed-loop control signal to the printing press when a limiting value is exceeded by the evaluation data.

7. The method of claim 5, wherein said step of outputting the evaluation data is performed in real time.

8. The method of claim 1, further comprising the step of graphically outputting at least one of the first and second measured data.

9. The method of claim 1, further comprising the step of outputting at least one of the first and second measured data in a configurable report.

10. The method of claim 1, wherein the first measured data comprises ink density, colour register, cut register and web tension.

11. The method of claim 1, wherein the second measured data comprises at least one of data registered automatically and data entered by a user.

12. The method of claim 3, further comprising the step of outputting the evaluation statistical data on a display device.

13. The method of claim 1, further comprising the step of outputting an open-loop or closed-loop control signal to the printing press when a limiting value is exceeded by the evaluation statistical data.

14. The method of claim 1, wherein the evaluation data formed during said step of combining includes the first and second measured data placed in a timed based relationship with one another to monitor the printing process.

15. The method of claim 1, wherein said method is implemented using a computer program.

16. A computer readable medium storing computer executable instructions for monitoring the printing process of a press, the computer executable instructions including instructions for performing the steps of:

acquiring first measured data using a quality data acquisition device, the first measured data at least one of reproducing and influencing a quality of the printed product;

acquiring second measured data using a machine data acquisition device, the second measured data including data reproducing the state of at least part of the printing press and data reproducing the consumption of the materials used; and combining the first measured data and the second measured data with one another to form evaluation data to monitor the printing process.

17. The method of claim 16, wherein the evaluation data formed during said step of combining includes the first and second measured data placed in a timed based relationship with one another to monitor the printing process.

18. The method of claim 1, further comprising the step of outputting a control command to the printing press or to a monitor of the printing press when the evaluation data exceeds a predetermined value.

19. The method of claim 16, further comprising the step of outputting a control command to the printing press or to a monitor of the printing press when the evaluation data exceeds a predetermined value.

* * * * *